(12) United States Patent
Marchou

(10) Patent No.: US 9,731,737 B2
(45) Date of Patent: Aug. 15, 2017

(54) METHOD FOR ASSISTING IMPLANTATION OF ACCESS POINTS OF A RADIO-COMMUNICATIONS INFRASTRUCTURE ALONG A RAILWAY TRACK

(71) Applicant: ALSTOM TRANSPORT TECHNOLOGIES, Levallois-Perret (FR)

(72) Inventor: Vincent Marchou, Paris (FR)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 95 days.

(21) Appl. No.: 14/490,304

(22) Filed: Sep. 18, 2014

(65) Prior Publication Data

US 2015/0088343 A1    Mar. 26, 2015

(30) Foreign Application Priority Data

Sep. 20, 2013   (FR) ...................................... 13 59056

(51) Int. Cl.
*B61L 27/00* (2006.01)
*H04W 16/18* (2009.01)
*H04W 24/02* (2009.01)

(52) U.S. Cl.
CPC ......... *B61L 27/0005* (2013.01); *H04W 16/18* (2013.01); *H04W 24/02* (2013.01)

(58) Field of Classification Search
None
See application file for complete search history.

(56) References Cited

U.S. PATENT DOCUMENTS

| 2008/0182583 A1* | 7/2008 | Le | H04W 16/20 |
|---|---|---|---|
| | | | 455/446 |
| 2012/0095651 A1* | 4/2012 | Anderson | G05D 1/0274 |
| | | | 701/50 |

OTHER PUBLICATIONS

Hills et al., "Rollabout: A Wireless Design Tool", IEEE Communications Magazine, Feb. 2004, pp. 132-138, vol. 42, No. 2.

\* cited by examiner

*Primary Examiner* — Redhwan K Mawari
*Assistant Examiner* — Paul Castro
(74) *Attorney, Agent, or Firm* — Thompson Coburn LLP

(57) ABSTRACT

With first and second wagons (1, 3), including an emitter similar to the one of an access point and a receiving wagon (2), including a receiver similar to the one of a device onboard a train and measuring a quantity relating to a received signal, this method consists of: placing the first wagon at a previous implantation point while the emitter of the first wagon emits a first signal, moving the receiving wagon away from the first wagon; when the quantity relating to the first signal is under a threshold, immobilizing the receiving wagon; while the emitter of the second wagon emits a second signal, moving the second wagon away from the receiving wagon; when the quantity relating to the second signal is under the threshold, immobilizing the second wagon; and storing its position as the implantation point of an access point.

6 Claims, 3 Drawing Sheets

METHOD FOR ASSISTING IMPLANTATION OF ACCESS POINTS OF A RADIO-COMMUNICATIONS INFRASTRUCTURE ALONG A RAILWAY TRACK

CROSS-REFERENCE TO RELATED APPLICATIONS

This application claims the benefit of French Application No. 13 59056 filed Sep. 20, 2013, which is incorporated by reference herein in its entirety.

BACKGROUND

The field of the invention is that of methods for assisting with the implantation, along a railway track, of access points of a radio-communications infrastructure.

A communication system, for example of the DCS "Data Communication System" type, is a component of the architecture for controlling train traffic, for example of the CBTC "Communication Based Train Control" type.

The communication system is based on a radio-communications infrastructure including a plurality of access points, fixed to the ground, which are distributed along the track. An access point allows establishment of a wireless connection with a device on board a train running along the track, when this device is located inside the coverage cell associated with the access point. The wireless connection for example observes the WiFi 802.11 protocol.

The radio-communications infrastructure should have continuous coverage over the whole of the length of the track, so as to allow a train running along the latter to permanently communicate with the ground, in order to exchange data relating to the control and to the safety of its movement.

Accordingly, the implantation of the different access points making up the radio-communications infrastructure should lead to obtaining continuous coverage, i.e. such that the coverage cells of two access points successively positioned along the track partially overlap.

Up to now, the implantation of access points is achieved on site according to a plan resulting from a theoretical study conducted in the engineering office. This study takes into account significant margins for guaranteeing the continuity of the coverage of the infrastructure to be achieved.

The implantation includes temporarily setting up access points at kilometric points indicated on the plan.

Next, a coverage study is carried out, consisting of having a vehicle run along the track between the pre-positioned access points, so as to check that there is actually continuity in the radio-communications coverage.

Subsequently to this study, the plan is updated. In particular, in the case of discontinuity of the coverage, an additional access point is positioned so that its coverage cell will fill the identified space, or both neighboring access points are brought closer to each other in order to fill the identified space.

Finally, the access points are definitively set up at the kilometric points indicated on the updated plan.

This way of proceeding leads to a significant overlap of the different cells between them and therefore to the use of a large number of access points.

Therefore there exists a need for optimizing the number and the placement of the access points of a radio-communications infrastructure along a railway line, while guaranteeing that a radio-communications infrastructure is produced forming a continuous coverage.

SUMMARY OF THE INVENTION

The object of the invention is therefore to meet this need.

The object of the invention is a method for assisting with the implantation, along a railway track, of a plurality of access points of a radio-communications infrastructure, so that the infrastructure has optimum coverage for a radio-communications device loaded on board a vehicle running on the track, characterized in that it first consists of providing:

first and second emitting wagons, each emitting wagon being able to run along the track and including an emission means, similar to an emission means with which the access points to be implanted are equipped, and controlled in order to emit a characteristic signal; and, a receiving wagon, able to run along the track and including at least one receiving means, said or each receiving means being similar to a receiving means with which the device loaded on board a vehicle is equipped, running on the track and being able to measure a quantity relating to the received characteristic signal, and then to reiterate the steps consisting of:
a) placing the first emitting wagon in a point of the track corresponding to the point of implantation of an access point determined in the preceding iteration;
b) while the emission means of the first emitting wagon emits a first characteristic signal, moving the receiving wagon in a first direction, away from the first emitting wagon;
c) as soon as said quantity relating to the first characteristic signal is less than a reference value, immobilizing the receiving wagon;
d) while the emission means of the second emitting wagon emits a second characteristic signal, moving the second emitting wagon in the first direction, away from the receiving wagon;
e) as soon as said quantity relating to the second characteristic signal is less than the reference value, immobilizing the second emitting wagon; and
f) storing in memory the current position of the second emitting wagon as an implantation point of an access point.

According to particular embodiments, the method includes one or more of the following features, taken individually or according to all the technically possible combinations:

the receiving wagon includes:
a front receiving means, similar to a front receiving means of a device loaded on board a vehicle intended to run on the track; and,
a rear receiving means, similar to a rear receiving means of a device loaded at the rear of a vehicle intended to run on the track, in that the steps a) to e) are applied, by using the front receiving means of the receiving wagon, so as to determine a provisional implantation point, and in that the method continues with the steps consisting of, by using the rear receiving means of the receiving wagon:

g) moving the receiving wagon in the first direction, away from the first emitting wagon;

h) as soon as the quantity relative to the first characteristic signal is less than the reference value, immobilizing the receiving wagon;

i) checking whether the quantity relative to the second characteristic signal is less than the reference value; and, if not, j) moving the second emitting wagon in the opposite direction, towards the receiving wagon; and, k) as soon as the quantity relative to the second characteristic signal is greater than the reference value, immobilizing the second emitting wagon;

e) storing in memory the current position of the second emitting wagon as an implantation point of an access point.

the steps are iterated by moving, for the next iteration, the first emitting wagon as far as the implantation point of an access point determined in the preceding iteration, so as to gradually cover the railway track.

the quantity relative to the signal emitted by an emitting wagon and received by the receiving wagon is the power of the signal.

the characteristic signal is a beacon signal preferably including an identifier of the emitting wagon.

The object of the invention is also a system for applying a method according to the preceding method.

BRIEF DESCRIPTION OF THE DRAWINGS

The invention and advantages thereof will be better understood upon reading the description which follows of two embodiments of the method of the invention, only given as an illustrative and non-limiting example, and made with reference to the appended drawings wherein.

DETAILED DESCRIPTION

Figure 1:
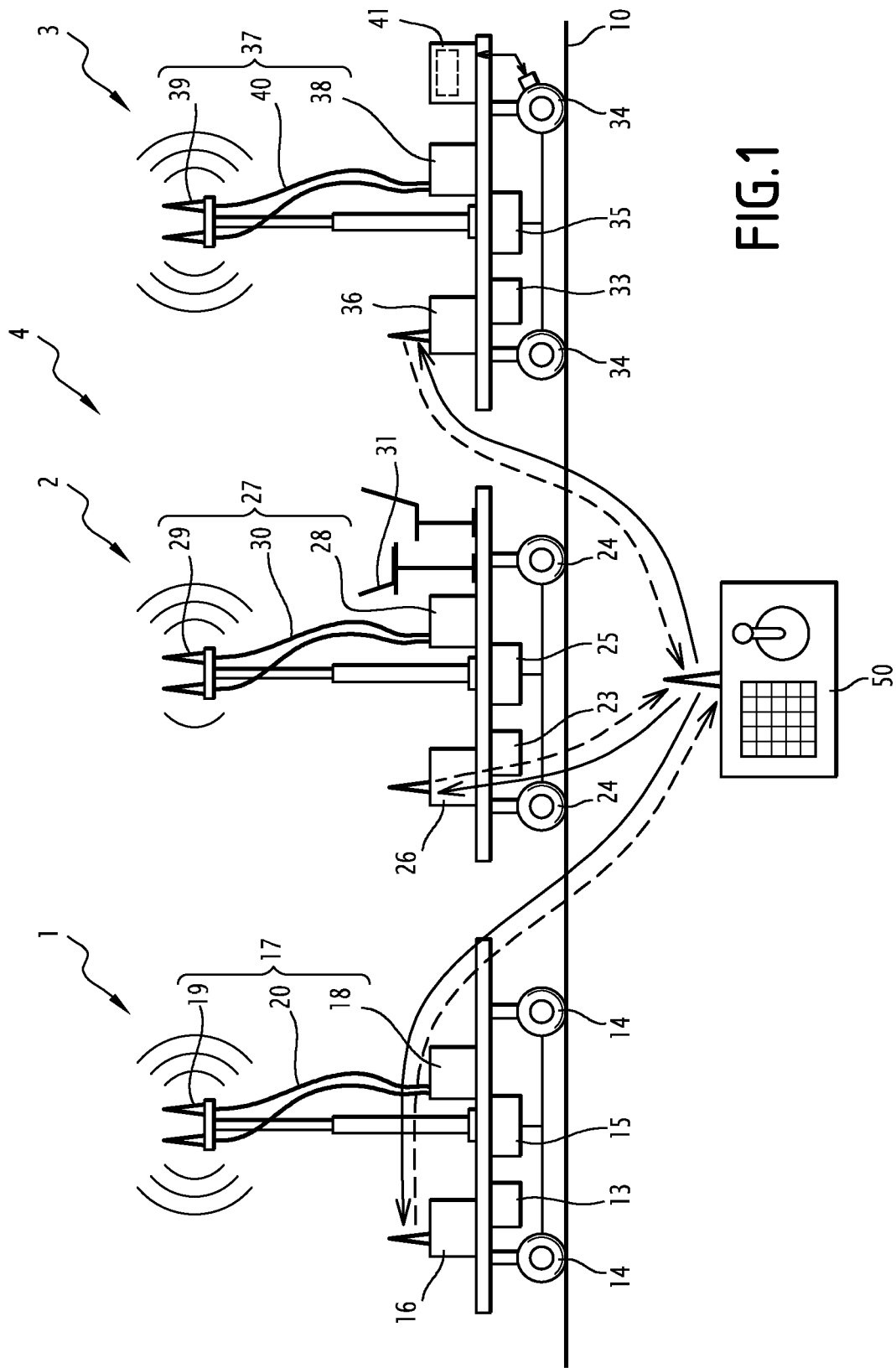
FIG. 1 is a schematic illustration of the system for applying a first embodiment of the method for assisting with the implantation of access points according to the invention.

A first embodiment of the method for assisting with the implantation, along a railway track, of access points of a radio-communications infrastructure will now be described with reference to FIGS. 1 and 2.

The application of this method is carried out by means of a system 4 including a first emitting wagon 1, a receiving wagon 2 and a second emitting wagon 3.

The first emitting wagon 1 includes:
an electric power source 13, giving the possibility of powering the different pieces of equipment of the wagon;
wheels 14, adapted for having the wagon run on the railway track 10, along which the radio-communications infrastructure is to be implanted;
propulsion means 15, including an electric motor and means for coupling the motor to the wheels 14, in order to move the wagon along the track;
a control device 16, allowing an operator provided with a remote control 50 to remotely control the propulsion means 15; and,
a radioelectric emission means 17, allowing the first emitting wagon 1 to simulate the operation of an access point to be implanted;

The emission means 17 is similar to the one with which one of the access points to be implanted along the track 10 is equipped.

The emission means 17 includes a radio-communications module 18, a set of antennas 19, and cables 20 connecting the module 18 to the set of antennas 19.

The emitting wagon 1 includes a mast at the top of which is attached the set of antennas 19.

The set of antennas 19 for example consists of four "patch" antennas similar to each other and positioned according to a pre-defined pattern. They are able to operate for example in the allocated frequency band from 5.150 GHz to 5.875 GHz.

The length of the cables 20 between the module 18 and the set of antennas 19 are selected so as to be equal to the one used in the access points to be implanted, so as to simulate the power losses along this cable.

Indeed, the power of a signal emitted by the emission means is an antenna foot measurement, i.e. at the output of the radio-communications module 18.

During operation, the means 17 periodically emits a characteristic signal in a channel of the allocated frequency band to the radio-communications infrastructure. The characteristic signal is for example a beacon signal, periodically emitted, for example, every 30 ms. As known to one skilled in the art, a beacon signal allows a receiver to detect the presence of an access point in order to initiate a process for establishing a wireless connection. In particular, the beacon signal includes a piece of information for identifying the first emitting wagon 1, such as a MAC address of this wagon.

The second emitting wagon 3 is identical with the first emitting wagon 1.

It includes:
an electric power source 33;
wheels 34;
propulsion means 35;
a control device 36, allowing an operator provided with the remote control 50 to remotely control the propulsion means 35 for moving the wagon 3; and,
a radioelectric emission means 37, allowing the second emitting wagon 3 to simulate the operation of an access point to be implanted.

The means 37 includes a radio-communications module 38, a set of antennas 39, and cables 40 connecting the module 38 to the set of antennas 39.

During operation, the means 37 periodically emits a beacon signal including the MAC address of the second emitting wagon 3. This beacon signal is emitted in the same channel as the one used by the radioelectric emission means 17 of the first emitting wagon 1.

The second emitting wagon 3 further includes:
an odometer 41, allowing determination of the instantaneous position of the second emitting wagon 3 along the track 10; preferably, this measurement of the position is given as a kilometric point PK relatively to a reference point taken as the origin of the track 10;

Like the emitting wagons, the receiving wagon 2 includes:
an electric power source 23;
wheels 24;
propulsion means 25; and
a control device 26, allowing an operator provided with the remote control 50 to remotely control the propulsion means 25 for moving the wagon 2.

The wagon 2 includes a radioelectric receiving means 27 allowing the receiving wagon 2 to simulate the operation of a receiving device loaded on board a train capable of running on the track 10;

The receiving means 27 is similar to the one with which an on-board device is equipped. It includes a radio-communications module 28, a set of antennas 29, and cables 30 connecting the module to the set of antennas. The receiving module 28 is able to deliver a measurement of the antenna foot power of a received signal, as well as the MAC address contained in the received signal.

A receiving wagon 2 includes a mast, at the top of which is attached a support on which is mounted the set of antennas 29.

The height of the mast is adjustable vertically, so that the height of the set of antennas 29 corresponds to that of the set of antennas of the device loaded on board a train.

Advantageously, when the set of antennas 29 is intended to be installed on the roof of the train, on a metal support, the support of the receiving wagon is metal and resumes the shape of the support used on the train. This gives the possibility of taking into account the influence of this metal support in the reception of signals.

The set of antennas 19 for example includes an antenna of the "shark" type able to operate in the allocated frequency band.

The set of antennas 19 has a radiation diagram which is not symmetrical in a horizontal plane. In particular, when it is mounted on a train, the set of antennas has a diagram having a main lobe oriented along a direction coinciding with a direction towards the front of the train and a secondary lobe oriented along a direction coinciding with a direction towards the rear of the train.

Figure 2:
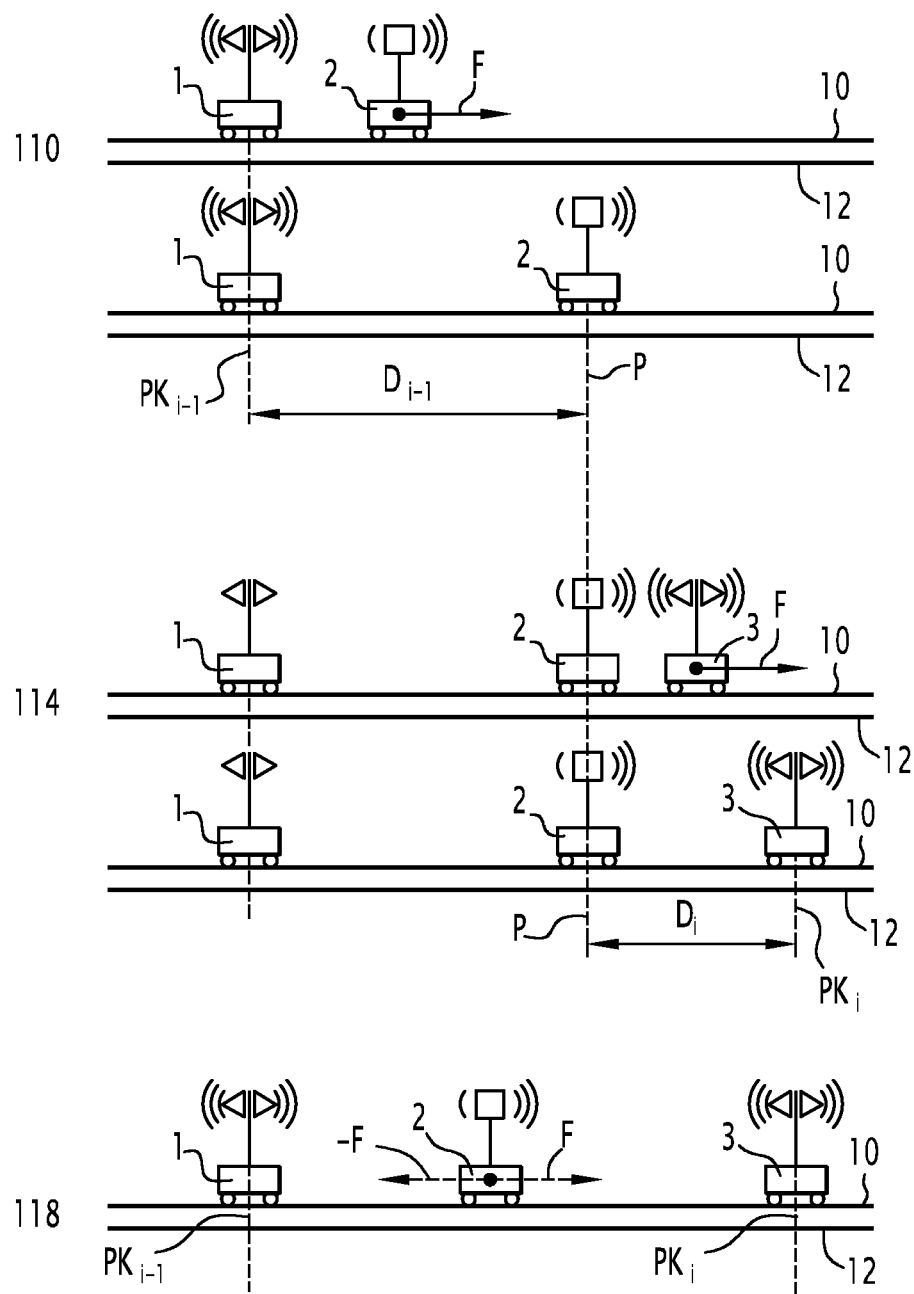
FIG. 2 is a schematic illustration of the different steps of the first embodiment of the method; and, FIG. 3 is a schematic illustration of a second embodiment of the method.

Care will then be taken to mount the set of antennas 29 on the receiving wagon 2 so that the main lobe corresponds to the forward motion direction of the wagon 2 (direction F in FIG. 2) and the secondary lobe to the rearward motion direction of the wagon 2 (direction −F in FIG. 2).

The receiving wagon 2 finally includes a processing terminal 31, for example a portable computer, connected to the receiving means 27.

The processing terminal 31 is able to analyze the information issued by the module 28. In particular, it is able to continuously collect, and for each MAC address, the measurement of the power P of the received signal.

The processing terminal 31 is able to compare the measured power P with a reference power, P0, for example with the value of −68 dBm.

As soon as the power P is less than the reference power P0, the processing terminal is able to generate a first alarm signal.

The method will now be presented with reference to FIG. 2.

The method is iterative. An iteration is marked with the identifier i.

The emission means 17 of the first emitting wagon 1 and the emission means 37 of the second emitting wagon 3 are active and simultaneously operate on a same channel of the allocated frequency band. Beacon signals are thus periodically emitted. It is advantageous to use the same channel for simultaneously viewing the powers of both signals on the processing terminal 31. In a commercial mode, different channels are of course used for avoiding interferences.

An iteration begins with step 110 consisting of moving the first emitting wagon 1, placed on the railway track 10, in order to bring it to a kilometric point corresponding to the implantation point of an access point determined in the preceding iteration of the method.

The receiving means 27 of the wagon 2 is active, so that the processing terminal 31 collects in real time the power P1 of the signal emitted by the first emitting wagon 1 and received by the receiving wagon 2.

The receiving wagon 2, placed on the track 10, is then moved along the latter in a forward direction, indicated by the arrow F in FIG. 2, so as to move the receiving wagon 2 away from the first emitting wagon 1.

As soon as the power P1 is less than the reference power P0, the processing terminal 31 emits a first alert signal, leading to the immobilization of the receiving wagon 2 in the location where it is found at this instant.

At the end of step 110, the maximum dimension $D_{i-1}$ of an upstream coverage cell is obtained.

Next, in step 114, the second emitting wagon 3, placed on the track 10, is then moved along the forward direction, F, away from the receiving wagon 2.

The receiving means of the receiving wagon 2 is active and the processing terminal 31 collects in real time the power P3 of the signal emitted by the second emitting wagon 3 and received by the receiving wagon 2.

As soon as the measured power P3 is less than the reference power P0, the processing terminal 31 emits a first alert signal, leading to immobilization of the second emitting wagon 3 in the location where it is found at this instant.

At the end of step 114, the second emitting wagon 3 is immobilized.

Advantageously, an additional step 118 is carried out, which consists of moving the receiving wagon 2 so as to cover the track section 10 between the first and second emitting wagons, 1 and 3, immobilized for checking the continuity of the radioelectric coverage.

If the checking is negative in that the coverage is not continuous over this track portion, the second emitting wagon 3 is moved towards the first emitting wagon 1, along a rearward direction, −F, so as to reduce the size of the cell associated with the second emitting wagon 3. The checking step is executed until continuous coverage is obtained.

If there is only one receiving means on the receiving wagon and for taking into account an asymmetry in the emission diagram of the set of antennas, then the method may advantageously continue by turning around the receiving wagon 2 (or the set of antennas 29) in order to simulate a train running on the track 10 in the opposite direction (−F) and by reiterating the preceding steps so as to adjust the position of the second emitting wagon 3.

Once continuous coverage is obtained, the odometer 41 with which the second emitting wagon 3 is equipped, is used for measuring the instantaneous position of the second emitting wagon 3 along the track 10.

The measured kilometric point $PK_i$ corresponds to the implantation point of the $i^{th}$ access point of the infrastructure. This position is stored in memory for example on a plan of the track.

Next, the method continues for a new iteration. The first emitting wagon 1 is then moved to the kilometric point $PK_i$ and steps 110 to 118 are executed once again, so as to determine the implantation point of the next access point.

The different steps are thus iterated so as to cover the whole of the track 10.

Figure 3:
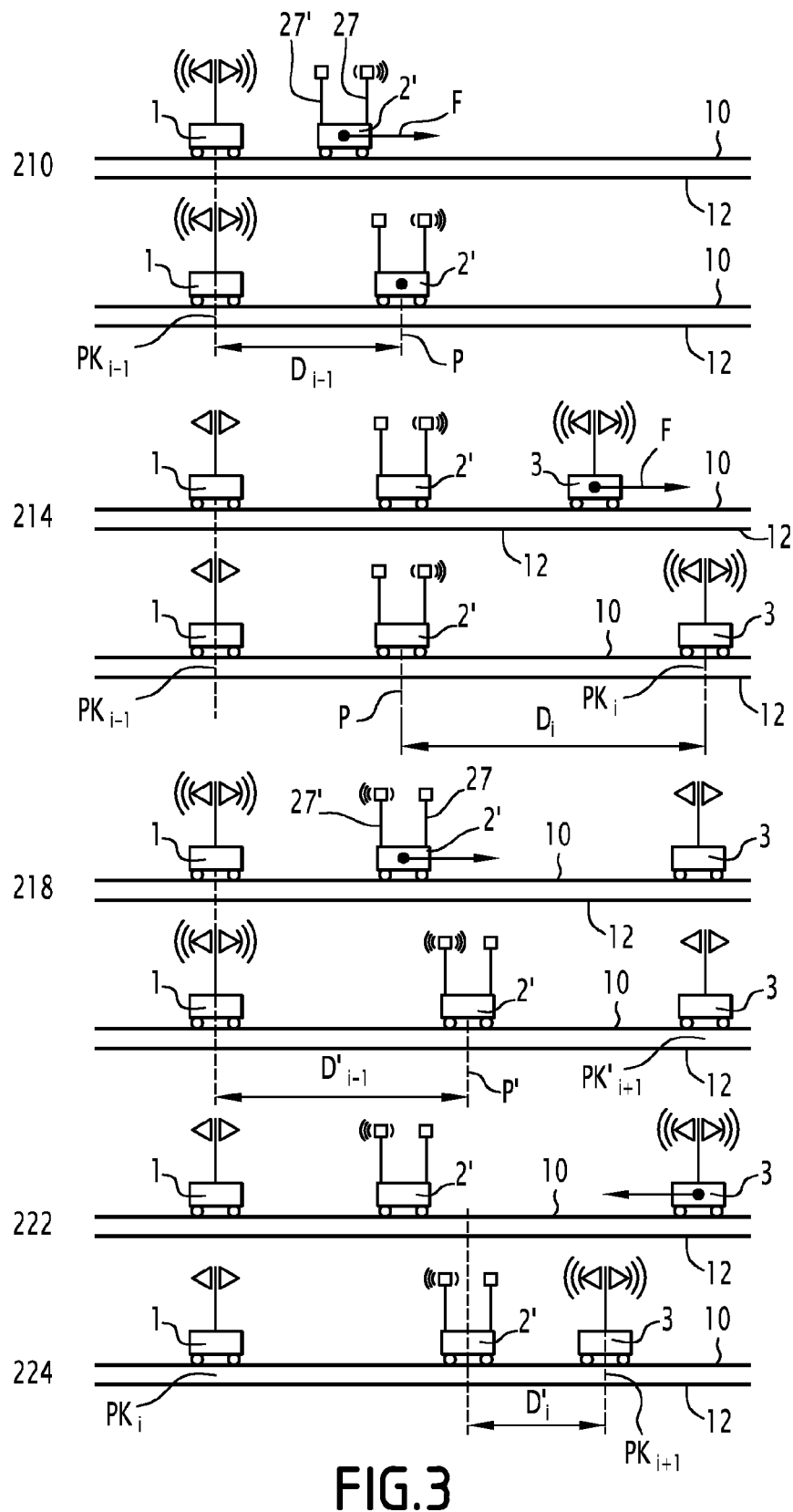

A second embodiment of the method will now be presented in connection with FIG. 3. This second embodiment applies a system modified in the following way, i+1.

A train often includes two radio-communications devices: one being placed at the front of the train and the other at the rear of the train.

The set of antennas of a radio-communications device does not have a symmetrical radiation diagram in the horizontal plane. The gain along a main direction is greater than the gain along a direction opposite to the main direction.

The set of antennas at the front of the train is attached so that its main direction points towards the front of the train, while the set of the antennas at the rear of the train is attached so that its main direction points towards the rear of the train. Thus, the front and rear sets of antennas of the train are mounted back to back.

The coverage of the infrastructure to be achieved should be continuous both for the front device and for the rear device of the train.

In order to simulate the reception of the signals by the front and rear devices of a train, the receiving wagon 2' includes a front receiving means 27, similar to the one of the front device of a train, and a rear receiving means 27', similar to the one of the rear device of a train.

Each receiving means is identical with the receiving means of the receiving wagon 2 of the first embodiment.

The set of antennas of the front receiving means 27 is borne by a support at the end of a front mast of the receiving wagon 2' so that the main direction of the set of antennas points towards the front of the wagon (direction F in FIG. 3), and the set of antennas of the rear receiving means 27' is borne by a support at the end of a rear mast of the receiving wagon 2', so that the main direction of the set of antennas points towards the rear of the wagon (direction –F in FIG. 3).

The processing terminal 31 of the receiving wagon 2' is connected to the module of the front receiving means 27 and to the module of the rear receiving means 27'. Each module is capable of measuring the power of an incident signal on the associated set of antennas. This power measurement, as well as the MAC address contained in the signal are applied at the input of the processing terminal.

An iteration $i$ of the method takes place in two successive phases.

The first phase is similar to the first embodiment above.

In a first step 210, the first emitting wagon 1 is moved along the track 10 so as to be positioned in a kilometric point $PK_{i-1}$ corresponding to the implantation point of an access point determined during the preceding iteration.

The emission means of the first wagon 1 is in an active mode, so that a characteristic signal is periodically emitted.

The front receiving means 27 of the receiving wagon 2' is in an active mode, while the rear receiving means of the latter is in an inactive mode.

The receiving wagon 2' is then moved forwards (along the direction F) away from the first emitting wagon 1. The processing terminal 31 recovers the power P11 of the received signal.

As soon as the power P11 is less than the reference power P0, the processing terminal emits a first alert signal able to lead to the immobilization of the receiving wagon 2.

In step 214, the second emitting wagon 3 is used. The emission means of the first emitting wagon 1 is then switched to the inactive mode, while the emission means of the second emitting wagon 3 is switched to the active mode.

The front receiving means 27 of the receiving wagon 2' remains in the active mode.

The second receiving wagon 3 is moved forwards, away from the emitting wagon 2'. The processing terminal 31 measures the power P31 of the signal emitted by the second emitting wagon 3 and received by the receiving wagon 2'.

As soon as the power P31 is less than the reference power P0, the processing terminal emits a first alert signal able to lead to the immobilization of the second emitting wagon 3.

The odometer 41 with which the second emitting wagon 3 is equipped is queried in order to obtain a measurement of the instantaneous position of the second emitting wagon 3 along the track 10. This position corresponds to a provisional value of the kilometric point $PK_i$ where the $i^{th}$ access point of the infrastructure is to be implanted.

The method continues with a second phase in which the front receiving means 27 of the receiving wagon 2' is in an inactive mode and the rear receiving means 27' of the receiving wagon 2' is in an active mode.

In step 218, while the emission means of the first emitting wagon 1 is activated, and the emission means of the second emitting wagon 3 is inactivated, the receiving wagon 2' is moved forwards, along the direction F, away from the wagon 1.

Indeed, in the first phase of the method, the receiving wagon 2' was immobilized in point $PK_i$ at the moment when the set of antennas of the front receiving means 27, which has reduced gain towards the rear, has lost contact with the emission means of the first emitting wagon 1. Since the set of antennas of the rear receiving means 27' has a larger gain towards the rear, the rear receiving means 27' of the receiving wagon 2' is in contact with the emission means of the first emitting wagon 1. The receiving wagon 2' should therefore be moved forwards in order to search for the point where the rear receiving means 27' loses contact with the first emitting wagon 1.

The processing terminal measures the power P12 of the received signal and immobilizes the receiving wagon 2' as soon as the power P12 is less than the reference power P0.

Next, in step 222, the emission means of the first emitting wagon 1 is inactivated, while the emission means of the second emitting wagon 3 is activated.

Still by using the rear receiving means 27', a measurement of the power P32 of the signal received by the receiving wagon 2' from the second emitting wagon 3 is conducted.

If this power P32 is greater than the reference power P0, this means that the position of the wagon 3 allows continuous coverage both for the front receiving means 27 (first phase of the method) and for the rear receiving means 27' (second phase of the method). The provisional position of the second emitting wagon 3 is retained as an implantation point $PK_i$ of the $i^{th}$ access point.

On the other hand, if the power P32 is less than the reference power P0, then in step 224, the second emitting wagon 3 is moved rearwards, along the direction –F, towards the receiving wagon 2'.

As soon as the power P32 of the signal received by the receiving wagon 2' from the second emitting wagon 3 exceeds the reference power P0, the processing terminal 31 generates a second alert signal leading to the immobilization of the second emitting wagon 3.

The odometer 41 with which the second emitting wagon 3 is equipped is queried in order to measure the updated position $PK'_i$. This position is retained as the implantation point of the $i^{th}$ access point.

Advantageously, as in the first embodiment, following steps 222 or 224, a checking step is carried out consisting of moving the receiving wagon 2' between the emitting wagons 1 and 3 in order to check whether there is actually continuity of the coverage both for the front receiving means 27 and for the rear receiving means 27', regardless of the direction of travel on the track.

Next, the method is iterated in order to determine the implantation point of the next access point. For this, the first emitting wagon 1 is moved to the kilometric point $PK_i$ or $PK'_i$ which has just been determined and the different steps illustrated in FIG. 3 are repeated.

Gradually, the length of the track is covered so as to determine the implantation points of the access points required for achieving a communications infrastructure having continuous coverage.

In the second embodiment, since both receiving means at each instant and at the same time have to be able to establish a wireless communication link with either one of the access points, the method allows dimensioning of the cells relatively to the worst of the receiving means, taking into account the operating environment.

On a train, the set of antennas is sometimes accommodated inside the cabin or under a protective polymeric layer. In this case, gain measurements of the set of antennas on the train, are conducted before adjusting the reference power P0 to be used in the method, for example by reducing it by 3 dB. When the studied network includes an outward track, reference 10 in the figures, and a return track, reference 12 in the figures, the access point to be implanted will not be located plumb with the track, for example 10, used for applying the method which has just been presented. The access point will for example be centered between both tracks 10 and 12. In order to take into account this lateral shift in the positioning of the access points, and therefore an additional attenuation of the radioelectric signals, a correction, for example by +3 dB, is taken into account in the reference power P0 to be used in the method.

In the case for example of a railway track for a metro line, various stations are provided along the track. The application of the present method should not lead to the installation of an access point right in the center of a station. The present method is therefore particularly well adapted to an application on a track portion between two successive stations.

It should be noted that the present method gives an upper limit on the size of the cells of the infrastructure. It is thus possible to reduce the size of the cells by bringing the implantation points closer to each other and by adding additional access points.

One skilled in the art will understand that the application of the present method has very many alternatives, in particular in the equipment used.

For example, the second embodiment of the method may be applied by means of the receiving wagon used for applying the first embodiment, by having this receiving wagon turn back between the first and second phases of an iteration. Thus, while the emission means simulates, in the first phase, the behavior of a front communications device, it simulates, in the second phase, the rear communications device of a train.

The present method has the advantage of suppressing the resorting to a theoretical study at the beginning of the project. This represents a significant gain in time. It avoids the errors for example related to a radioelectric configuration which could not be anticipated or taken into account in the engineering office.

By maximizing the size of the cells relatively to each other, the application of the method gives the possibility of minimizing the number of access points required for obtaining continuous coverage.

If, in the present method, the power of the exchange signals was measured and used as a criterion for determining the size of the cells, alternatively, other information relating to the signals may be used, such as for example information relating to the service quality on the temporary link between an emission means and a receiving means.

The emission means of an access point are in fact emission/receiving means. Also, the receiving means of an on-board device are in fact emission/receiving means. The operation of a radioelectric means as a receiver or an emitter is identical, in terms of radiation diagrams of the antennas, of coverage and cell size. Accordingly, the present method may be applied by inverting the operating mode of the radioelectric means which equip the wagons, the first and second emitting wagons becoming first and second receiving wagons and the receiving wagon becoming an emitting wagon. However, it would then be necessary to use two processing terminals for processing the power measurements delivered by each of the two receiving means.

The invention claimed is:

1. A method for assisting with an implantation, along a railway track, of a plurality of access points of a radio-communication infrastructure, so that the radio-communication infrastructure has an optimum coverage for a radio-communication device loaded on board a vehicle intended to run on the railway track, wherein the method first consists of providing:

first and second emitting wagons, each emitting wagon being able to run along the railway track and including an emitting means, identical to an emitting means which equips the access points to be implanted along the railway track and controlled so as to emit a characteristic signal; and a receiving wagon, able to run along the railway track and including at least one receiving means, said or each receiving means being identical to a receiving means which equips the radio-communication device loaded on board the vehicle intended to run on the railway track and being able to measure a quantity relating to the characteristic signal received, and wherein the method then consists, for the implantation along the railway track of a current access point of the plurality of access points relative to an implantation point of a preceding access point of the plurality of access points, a plurality of steps consisting of:

a) placing the first emitting wagon in a point of the railway track corresponding to the implantation point of the preceding access point;

b) while the emitting means of the first emitting wagon emits a first characteristic signal, moving the receiving wagon in a first direction, away from the first emitting wagon;

c) as soon as the quantity relating to the first characteristic signal is less than a reference value, immobilizing the receiving wagon;

d) while the emitting means of the second emitting wagon emits a second characteristic signal, moving the second emitting wagon in the first direction, away from the receiving wagon;

e) as soon as the quantity relating to the second characteristic signal is less than the reference value, immobilizing the second emitting wagon; and f) storing in memory the current position of the second emitting wagon as an implantation point of the current access point.

2. The method according to claim 1, wherein,
the receiving means being a front receiving means, identical to the receiving means of the radio-communication device loaded at the front of the vehicle intended to run on the railway track,
the receiving wagon further includes a rear receiving means, identical to the receiving means of a radio-communication device loaded at the rear of the vehicle intended to run on the railway track, and wherein the plurality of steps further consist of:
applying the steps a) to e) by using the front receiving means of the receiving wagon, so that the current position of the second wagon is stored as a provisional implantation point of the current access point;
and then, by using the rear receiving means of the receiving wagon:
g) moving the receiving wagon in the first direction, away from the first emitting wagon;
h) as soon as the quantity relating to the first characteristic signal is less than the reference value, immobilizing the receiving wagon;
i) checking whether the quantity relating to the second characteristic signal is greater than the reference value; and, if not,
j) moving the second emitting wagon in the opposite direction, towards the receiving wagon; and,
k) as soon as the quantity relating to the second characteristic signal is greater than the reference value, immobilizing the second emitting wagon;
l) storing in memory the current position of the second emitting wagon as the implantation point of the current access;
and, if yes, storing in memory the provisional implantation point as the implantation point of the current access point.

3. The method according to claim 1, wherein the plurality of steps is iterated so as to gradually cover the railway track by considering the implantation point of the current access point determined at the end of a given iteration of the plurality of steps, the implementation point of the preceding access point being the start of a following iteration of the plurality of steps.

4. The method according to claim 1, wherein the quantity relating to the signal emitted by the emitting wagon and received by the receiving wagon is the power of the signal.

5. The method according to claim 1, wherein the characteristic signal is a beacon signal preferably including an identifier of the emitting wagon.

6. A system for applying a method according to any of claims 1 to 5.

* * * * *